UNITED STATES PATENT OFFICE.

ROBERT R. ROBERTS, OF WASHINGTON, DISTRICT OF COLUMBIA, ASSIGNOR OF ONE-TENTH TO EUGENE ERNEST ALLWINE, OF WASHINGTON, DISTRICT OF COLUMBIA.

PROCESS OF TREATING VEGETABLE FIBERS.

1,062,187. Specification of Letters Patent. Patented May 20, 1913.

No Drawing. Application filed July 22, 1912. Serial No. 710,947.

*To all whom it may concern:*

Be it known that I, ROBERT R. ROBERTS, a citizen of the United States, residing at Washington, in the District of Columbia, have invented certain new and useful Improvements in Processes of Treating Vegetable Fibers; and I do hereby declare the following to be a full, clear, and exact description of the invention, such as will enable others skilled in the art to which it appertains to make and use the same.

My invention relates to the art of treating vegetable fiber-bearing stalks, such as flax, ramie, jute, hemp, pita and other plants containing fibers capable of use for the manufacture of textile fabrics, cordage or paper, and has for its object lessening the time and cost of chemicals used in treating the fibers and producing a superior article of commerce, in that the fiber is whiter, softer and rounder than that which has heretofore been produced.

The invention will be fully disclosed in the following specification and claims.

It is my purpose to treat green, but yet ripe and fully matured fibrous material by first breaking, deshiving and decorticating the stalks by suitably constructed machinery which will be fully illustrated and described in separate applications for patents.

In United States Patent No. 952,996, issued March 22, 1910 for a process of treating fibrous material, invented by me and in United States Patent No. 953,010 also issued March 22, 1910 for process of treating fibrous material, also invented by me, I have disclosed processes involving the use of a degumming solution containing caustic alkali, borate of soda and sal soda with or without a vegetable oil and with or without a hydrocarbon oil, and the use of sulfuric acid, nitric and other acids for bleaching the fiber, and while the process as disclosed in these patents or either of them produces excellent results, I have found that the use of the degumming solution in the manner hereinafter described and the subsequent treatment of the fiber by the use of the solutions hereinafter described produces even softer, whiter and better fiber and eliminates the use of acids for bleaching.

In carrying out the process of my present invention, I first decorticate the stalks, and then subject them to a solution in a suitably constructed vat, tank or the like which can be closed, containing proportionately from eighty (80) to one hundred (100) gallons of soft water which is heated so as to boil and cook the fibrous material, preferably under pressure. To the quantity of water specified is added about ten (10) pounds of sal soda, or about five (5) pounds of caustic soda, or five (5) pounds of granulated caustic potash; also about one (1) pound of animal fat or oil such as tallow, lard and the like, about one (1) pound of aqua ammonia and about two (2) pounds of soap, preferably naphtha soap. This quantity of chemical solution is designed to deresin and degum about two hundred (200) pounds of de-shived green flax or an equal amount of green hemp stalks.

The flax or hemp is preferably placed in suitably constructed galvanized wire baskets, of about one inch mesh and designed to hold from ten to twenty (10 to 20) pounds in each basket. The filled baskets are placed in a large and strongly constructed basket provided with a suitable bail so that it can be readily hoisted, and by an overhead trolley conveyed to another vat or tank. After being immersed in the solution, the flax, hemp or the like is boiled about ten (10) minutes, preferably under pressure of about sixty to eighty pounds (60 to 80), when it is removed and conveyed to another tank containing water, in which it is thoroughly washed. This first chemical treatment relieves the fiber of gum, resin, tannic and oleic acids and all coloring matter, and the solution is discharged from the vat for subsequent use as a fertilizer. The washed fiber, contained in the baskets is now conveyed to another tank or vat and subjected to a solution comprising about sixty (60) gallons of water, about ten (10) pounds of borated soap, about two (2) pounds of vegetable oil, such as linseed oil, and about one (1) pound of oleic acid, where it is boiled about ten (10) minutes, preferably under from about sixty to eighty (60 to 80) pounds pressure. The fiber is again washed while in the baskets, by decanting or drawing off the solution from the tank and supplying water thereto; after which the baskets containing the fiber are preferably placed in a centrifugal machine and the water removed, when the fiber is taken to a suitable room and the drying completed.

By the foregoing formula all acids have been eliminated, thus conserving all the natural strength possessed by any vegetable fiber and at the same time making the fibers round and beautifully white in appearance, which adds greatly to their commercial value in the textile art.

Having thus fully described my invention, what I claim is:—

1. The process herein described for treating fibrous material, which consists in boiling the material in an alkaline solution containing ammonia and animal fat.

2. The process herein described for treating fibrous material which consists in boiling the material in an alkaline solution under pressure containing ammonia and animal fat.

3. The process herein described for treating fibrous material, which consists in boiling the material in an alkaline solution containing ammonia, animal fat and soap.

4. The process herein described for treating fibrous material which consists in boiling the material in an alkaline solution containing ammonia, and animal fat, washing the material and subsequently treating the material in a boiling solution containing borated soap, vegetable oil and oleic acid.

5. The process herein described for treating fibrous material which consists in boiling the material in an alkaline solution under pressure containing ammonia and animal fat, washing the material, and subsequently treating the material in a boiling solution under pressure containing borated soap, vegetable oil and oleic acid.

6. The process herein described for treating fibrous material which consists in deshiving or decorticating the material, then subjecting it to an alkaline solution containing ammonia and animal fat, boiling the material under pressure, washing the material and then boiling it in a solution comprising borated soap, vegetable oil and oleic acid and washing the material.

In testimony whereof I affix my signature, in presence of two witnesses.

ROBERT R. ROBERTS.

Witnesses:
D. C. REINOHL,
W. PARKER REINOHL.